United States Patent
Li et al.

(10) Patent No.: US 11,714,035 B2
(45) Date of Patent: Aug. 1, 2023

(54) DEVICE FOR TESTING CORROSION FATIGUE RESISTANCE ON THE BASIS OF ACOUSTIC EMISSION

(71) Applicant: Changsha University of Science and Technology, Changsha (CN)

(72) Inventors: Wei Li, Changsha (CN); Zhuoyin Peng, Changsha (CN); Lei Li, Changsha (CN); Cong Li, Changsha (CN); Jian Chen, Changsha (CN); Fei Chen, Changsha (CN); Yong Yan, Changsha (CN); Dapeng Jiang, Changsha (CN); Guowei Bai, Changsha (CN); Yaopeng Chang, Changsha (CN); Huang Huang, Changsha (CN); Weiying Huang, Changsha (CN); Libo Zhou, Changsha (CN); Jianlin Chen, Changsha (CN); Yanjie Ren, Changsha (CN); Jianjun He, Changsha (CN)

(73) Assignee: Changsha University of Science and Technology, Changsha (CN)

(*) Notice: Subject to any disclaimer, the term of this patent is extended or adjusted under 35 U.S.C. 154(b) by 0 days.

(21) Appl. No.: 18/172,181

(22) Filed: Feb. 21, 2023

(65) Prior Publication Data
US 2023/0204481 A1 Jun. 29, 2023

Related U.S. Application Data

(63) Continuation of application No. PCT/CN2021/084243, filed on Mar. 31, 2021.

(30) Foreign Application Priority Data

Dec. 29, 2020 (CN) .......................... 202011597843.6

(51) Int. Cl.
G01N 3/08 (2006.01)
G01N 3/06 (2006.01)
G01N 1/44 (2006.01)

(52) U.S. Cl.
CPC ................. *G01N 3/08* (2013.01); *G01N 1/44* (2013.01); *G01N 3/06* (2013.01); *G01N 2203/0017* (2013.01); *G01N 2203/04* (2013.01)

(58) Field of Classification Search
CPC .. G01N 3/06; G01N 3/08; G01N 1/44; G01N 2203/04; G01N 2203/0017
See application file for complete search history.

(56) References Cited

U.S. PATENT DOCUMENTS

| 3,946,600 A | 3/1976 | Rettig et al. |
| 11,378,501 B2* | 7/2022 | Zhang ...................... G01N 3/32 |

(Continued)

FOREIGN PATENT DOCUMENTS

| CN | 103776702 A | 5/2014 |
| CN | 107101885 A | 8/2017 |

(Continued)

OTHER PUBLICATIONS

First Office Action issued in counterpart Chinese Patent Application No. 202011597843.6, dated Aug. 23, 2021.

(Continued)

*Primary Examiner* — Jonathan M Dunlap
(74) *Attorney, Agent, or Firm* — Westbridge IP LLC

(57) ABSTRACT

Disclosed is a device for testing corrosion fatigue resistance on the basis of acoustic emission. The device includes: a main machine including a supporting frame and a tensile mechanism arranged on the supporting frame; a clamping mechanism including a first clamp and a second clamp that is arranged opposite the first clamp, where the first clamp (Continued)

and the second clamp are both connected to the tensile mechanism, the tensile mechanism is used for driving the first clamp and the second clamp to move close to or away from each other, the first clamp is provided with an accommodation cavity for accommodating a corrosive substance, the accommodation cavity is provided with an opening that is provided on the first clamp and close to one end of the second clamp, and the first clamp can place a test specimen in the accommodation cavity when fixing the test specimen.

6 Claims, 4 Drawing Sheets

(56) References Cited

U.S. PATENT DOCUMENTS

| | | | | |
|---|---|---|---|---|
| 2013/0298693 | A1* | 11/2013 | Gibson | G01N 3/32 73/826 |
| 2020/0225135 | A1* | 7/2020 | Zhang | G01N 3/32 |

FOREIGN PATENT DOCUMENTS

| | | | |
|---|---|---|---|
| CN | 107702990 | A | 2/2018 |
| CN | 108254272 | A | 7/2018 |
| CN | 108519321 | A | 9/2018 |
| CN | 110044806 | A | 7/2019 |
| CN | 110095336 | A | 8/2019 |

OTHER PUBLICATIONS

Second Office Action issued in counterpart Chinese Patent Application No. 202011597843.6, dated Dec. 28, 2021.

* cited by examiner

DEVICE FOR TESTING CORROSION FATIGUE RESISTANCE ON THE BASIS OF ACOUSTIC EMISSION

CROSS-REFERENCE TO RELATED APPLICATIONS

This application is a continuation of International Application No. PCT/CN2021/084243, filed on Mar. 31, 2021, which claims priority to Chinese Patent Application No. 202011597843.6, filed on Dec. 29, 2020. All of the aforementioned applications are incorporated herein by reference in their entireties.

TECHNICAL FIELD

The present disclosure relates to the technical field of corrosion resistance tests, and particularly to a device for testing corrosion fatigue resistance on the basis of acoustic emission.

BACKGROUND

Performance of heat transfer and storage media has an effect on power generation efficiency of a concentrating solar thermal power (CSP) system. Compared with current commonly-used heat transfer and storage media (water vapor, molten salt and heat transfer oil), an aluminum-silicon alloy is considered as a new generation alternative on account of merits of a high heat storage capacity, favorable thermal conductivity and excellent oxidation resistance, etc. During practical application, the CSP system starts and stops periodically with alternation of day and night, which causes large dynamic load fluctuations and fatigue damage to a heat exchange tube. Moreover, the heat exchange tube keeps being corroded by molten aluminum-silicon alloys on two sides of the heat exchange tube for concentrating solar thermal power. Therefore, in a fatigue test for determining a material of a heat exchange tube, it is required to add a molten aluminum-silicon alloy corrosive environment to simulate an actual working condition.

At present, some scholars have researched a metal corrosion fatigue test device in a high temperature environment. For example, in the patent with application number of 201410020154.7, a test specimen passes through a corrosive pot containing a corrosive liquid to conduct a low-cycle fatigue test. In the patent, a connecting plate and a sensing column are generally used to connect an extensometer outside the corrosive pot, so as to prevent the extensometer from being corroded. However, a strain measured this way is not a strain of a middle portion of a tested test specimen. In the patent, a strain of a test specimen is simulated through a finite element method, and when data is processed at last, a strain between strain measurement devices is converted into a strain between gauge lengths of the extensometer according to a corresponding relation. However, accuracy of finite element simulation is far from satisfying.

SUMMARY

The present disclosure aims to solve at least one of the technical problems in the prior art. In view of this, the present disclosure provides a device for testing corrosion fatigue resistance on the basis of acoustic emission, which is used for solving the problem of low accuracy of a traditional device for testing metal corrosion fatigue resistance.

A device for testing corrosion fatigue resistance on the basis of acoustic emission according to some embodiments of the present disclosure includes: a main machine including a supporting frame and a tensile mechanism arranged on the supporting frame; a clamping mechanism including a first clamp and a second clamp that is arranged opposite the first clamp, where the first clamp and the second clamp are both connected to the tensile mechanism, the tensile mechanism is used for driving the first clamp and the second clamp to move close to or away from each other, the first clamp is provided with an accommodation cavity for accommodating a corrosive substance, the accommodation cavity is provided with an opening that is provided on the first clamp and close to one end of the second clamp, and the first clamp may place a test specimen in the accommodation cavity when fixing the test specimen; a strain measurement mechanism including a first acoustic emission sensor, a second acoustic emission sensor and an acoustic emitter, where the first acoustic emission sensor and the second acoustic emission sensor are both in communication connection with the acoustic emitter, and the first acoustic emission sensor and the second acoustic emission sensor are arranged on the test specimen at an interval in a tensile direction of the test specimen; and a protective assembly for being connected to the test specimen and capable of isolating the first acoustic emission sensor and the second acoustic emission sensor from the corrosive substance when the test specimen is placed in the accommodation cavity.

The device for testing corrosion fatigue resistance on the basis of acoustic emission according to an embodiment of the present disclosure at least has technical effects as follows:

when the above device for testing corrosion fatigue resistance on the basis of acoustic emission is used, two ends of the test specimen are fixed by the first clamp and the second clamp respectively, and the test specimen is placed in the accommodation cavity and surrounded by the corrosive substance such that the test specimen may be placed in a corrosive environment. In addition, in a process that the test specimen is placed in the corrosive environment, the protective assembly may isolate the first acoustic emission sensor and the second acoustic emission sensor from the corrosive substance, so as to prevent the first acoustic emission sensor and the second acoustic emission sensor from being corroded. The tensile mechanism may drive the first clamp and the second clamp to more away from each other, such that the test specimen is stretched with a load borne. The first acoustic emission sensor and the second acoustic emission sensor may start to collect stress waves at an initial stage of stretching the test specimen, and the acoustic emitter may record data such as amplitudes, ringing counts, duration, rise time and/or relative energy of the wave forms, such that deformation of the test specimen, crack initiation positions and crack propagation speeds are analyzed and/or residual fatigue life is computed according to the above data, and accuracy is high.

According to some embodiments of the present disclosure, the tensile mechanism includes a tensile assembly and a driving source in drive connection to the tensile assembly, the tensile assembly includes a first tensile member and a second tensile member that is arranged opposite the first tensile member at an interval, the driving source is used for driving the first tensile member and the second tensile member to move close to or away from each other, the first clamp is connected to the first tensile member, and the second clamp is connected to the second tensile member.

According to some embodiments of the present disclosure, one end of the first tensile member close to the second tensile member is provided with a first assembly hole, one end of the first clamp away from the second clamp passes through the first assembly hole, the accommodation cavity is provided with the bottom wall that is arranged opposite the opening, the bottom wall is provided with a first mounting hole, and the first mounting hole is used for the test specimen to pass through; and one end of the second tensile member close to the first tensile member is provided with a second assembly hole, one end of the second clamp away from the first clamp passes through the second assembly hole, and one end of the second clamp close to the first clamp is provided with a second mounting hole for the test specimen to pass through.

According to some embodiments of the present disclosure, the driving source is in drive connection to the first tensile member, so as to drive the first tensile member to move close to or away from the second tensile member. The device for testing corrosion fatigue resistance on the basis of acoustic emission further includes a force sensor and a displacement sensor, the force sensor is used for measuring a load borne by the test specimen, and the displacement sensor is used for measuring a displacement change of the first tensile member.

According to some embodiments of the present disclosure, the protective assembly includes a first protector, and the first protector is used for sleeving the test specimen to seal the first acoustic emission sensor, so as to isolate the first acoustic emission sensor from the corrosive substance when the test specimen is placed in the accommodation cavity.

According to some embodiments of the present disclosure, the first protector is connected to a wall of the accommodation cavity in a sealed manner when the test specimen is placed in the accommodation cavity, so as to divide the accommodation cavity into a corrosive cavity and a protective cavity. The corrosive cavity is used for carrying the corrosive substance, and the first acoustic emission sensor is located in the corrosive cavity.

According to some embodiments of the present disclosure, a protective portion is formed on the wall of the accommodation cavity, the protective portion is provided with a signal wire channel, one end of the signal wire channel extends towards the opening to form a wire inlet, the other end of the signal wire channel extends towards a bottom of the accommodation cavity to form a wire outlet, and the first protector abuts against an exterior of the protective portion, so as to make the wire outlet in communication with the protective cavity and isolate the wire outlet from the corrosive cavity.

The strain measurement mechanism further includes a first signal wire, one end of the first signal wire passes through the signal wire channel to be connected to the first acoustic emission sensor, and the other end thereof is in communication connection with the acoustic emitter.

According to some embodiments of the present disclosure, the first protector includes a top cover and a side cover connected to the top cover, the top cover is connected to a side wall of the accommodation cavity in a sealed manner, so as to divide the accommodation cavity into a corrosive cavity and a protective cavity, the side cover is connected to a bottom wall of the accommodation cavity in a sealed manner, so as to divide the protective cavity into a first cavity and a second cavity, the side cover is further provided with a wire port for being in communication with the first cavity and the second cavity, the first acoustic emission sensor is located in the second cavity, and one end of the first signal wire sequentially passes through the wire outlet, the first cavity, the wire port and the second cavity to be connected to the first acoustic emission sensor.

According to some embodiments of the present disclosure, the protective assembly further includes a second protector, and the second protector is used for sleeving the test specimen to seal the second acoustic emission sensor, so as to isolate the second acoustic emission sensor from the corrosive substance when the test specimen is placed in the accommodation cavity.

According to some embodiments of the present disclosure, the device for testing corrosion fatigue resistance on the basis of acoustic emission further includes a heater, the heater is provided with a heating chamber, and the clamping mechanism is located in the heating chamber.

According to some embodiments of the present disclosure, the device for testing corrosion fatigue resistance on the basis of acoustic emission further includes a temperature sensor, and the temperature sensor is used for measuring a temperature of the heating chamber.

BRIEF DESCRIPTION OF THE DRAWINGS

The above and/or additional aspects and advantages of the present disclosure will become obvious and readily comprehensible from description of embodiments in combination with accompanying drawings.

DETAILED DESCRIPTION OF THE EMBODIMENTS

Figure 1:
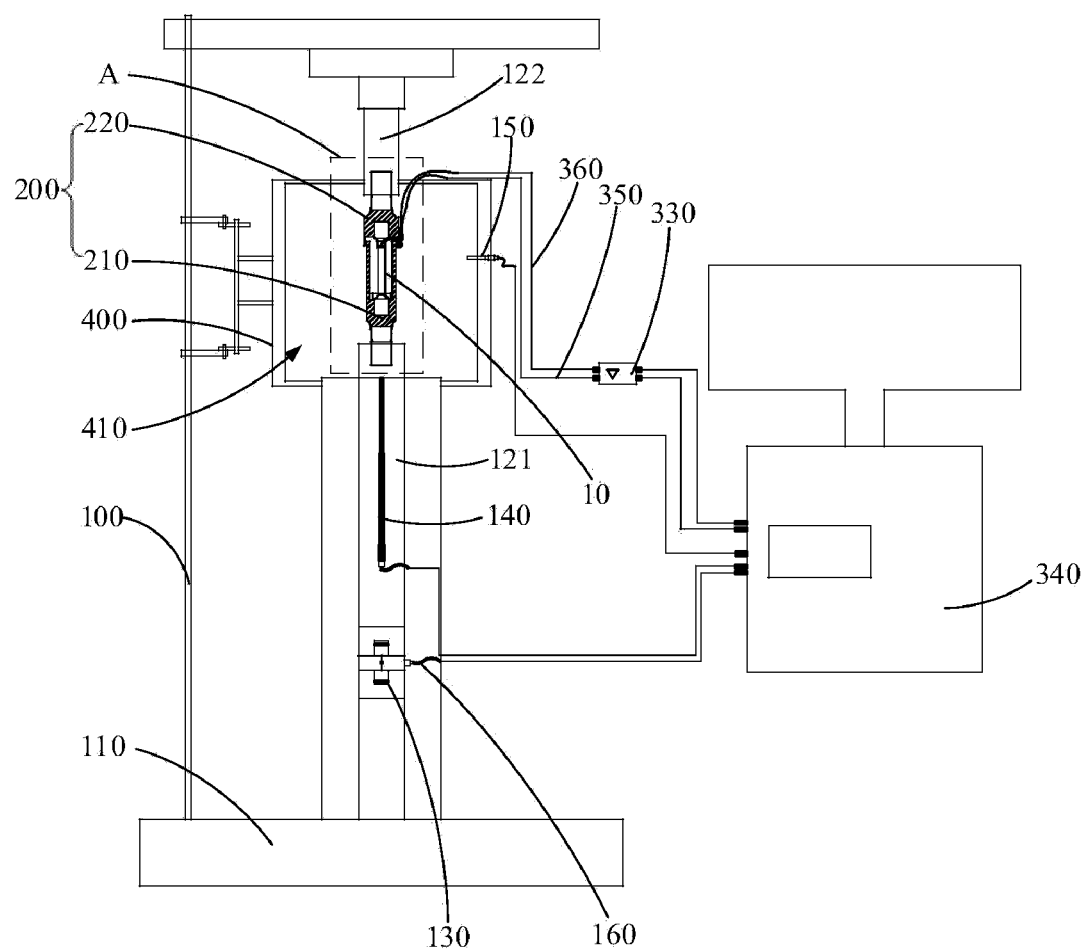
FIG. 1 is a schematic structural diagram of a device for testing corrosion fatigue resistance on the basis of acoustic emission according to an embodiment of the present disclosure.

Embodiments of the present disclosure will be described in detail below, and examples of the embodiments are shown in accompanying drawings, throughout which identical or similar reference numerals denote identical or similar elements or elements having identical or similar functions. Embodiments described with reference to accompanying drawings are exemplary and merely used for explaining the present disclosure, instead of being construed as a limitation to the present disclosure.

In the description of the present disclosure, it should be understood that terms "central", "longitudinal", "transverse", "length", "width", "thickness", "upper", "lower", "front", "back", "left", "right", "vertical", "horizontal", "top", "bottom", "inner", "outer", "axial", "radial", "circumferential", etc. indicate orientation or positional relations based on those shown in accompanying drawings only for ease of description of the present disclosure and for simplicity of the description, and are not intended to indicate or imply that the referenced device or element must have a particular orientation and be constructed and operated in a particular orientation, and thus cannot be construed as a limitation to the present disclosure. In addition, a feature defined with "first" and "second" can explicitly or implicitly include one or more of the features. In the description of the present disclosure, "plurality of" means two or more, unless otherwise specified.

In the description of the present disclosure, it should be noted that unless otherwise explicitly specified and defined, terms "arranged", "connected to each other" and "connection" should be understood in a broad sense. For example, a connection can be a fixed connection, a detachable connection, or an integrated connection; can be a mechanical connection or an electrical connection; can be a direct connection, or an indirect connection by means of an intermediate medium; or can be communication of interiors of two elements. Those of ordinary skill in the art can understand the specific meanings of the above terms in the present disclosure according to specific circumstances.

As shown in FIG. 1, an embodiment relates to a device for testing corrosion fatigue resistance on the basis of acoustic emission. The device includes a main machine 100, a clamping mechanism 200, a strain measurement mechanism and a protective assembly.

The main machine 100 includes a supporting frame 110 and a tensile mechanism arranged on the supporting frame.

Specifically, the tensile mechanism includes a tensile assembly and a driving source 130, the tensile assembly includes a first tensile member 121 and a second tensile member 122 that is arranged opposite the first tensile member 121 at an interval, and the driving source 130 is in drive connection to the tensile assembly, so as to drive the first tensile member 121 and the second tensile member 122 to move close to or away from each other.

More specifically, the supporting frame 110 mainly plays a role of bearing and supporting, the driving source 130 may be a servo motor or an air cylinder, and the driving source 130 is in drive connection to the first tensile member 131 or the second tensile member 122, so as to drive the first tensile member 121 and the second tensile member 122 to move close to or away from each other.

In this embodiment, the driving source 130 is in drive connection to the first tensile member 121, so as to drive the first tensile member 121 to move close to or away from the second tensile member 122.

Further, the main machine 100 further includes a force sensor 160 and a displacement sensor 140. The force sensor 160 is arranged between the driving source 130 and the first tensile member 121, so as to measure a load borne by the test specimen 10 during a test, such that a tensile force borne by the test specimen 10 may be conveniently manually adjusted. The displacement sensor 140 is arranged on the supporting frame 110, so as to measure a position change of the first tensile member 121.

As shown in FIG. 1, the clamping mechanism 200 includes a first clamp 210 and a second clamp 220 that is arranged opposite the first clamp 210, the first clamp 210 and the second clamp 220 are both connected to the tensile mechanism, and the tensile mechanism is used for driving the first clamp 210 and the second clamp 220 to move close to or away from each other.

Specifically, the first clamp 210 is used for being fixed on the first tensile member 121, and the second clamp 220 is used for being fixed on the second tensile member 122. When the driving source 130 drives the first tensile member 121 and the second tensile member 122 to move close to each other (or away from each other), the first clamp 210 and the second clamp 220 may be driven to move close to each other (or away from each other).

Figure 2:
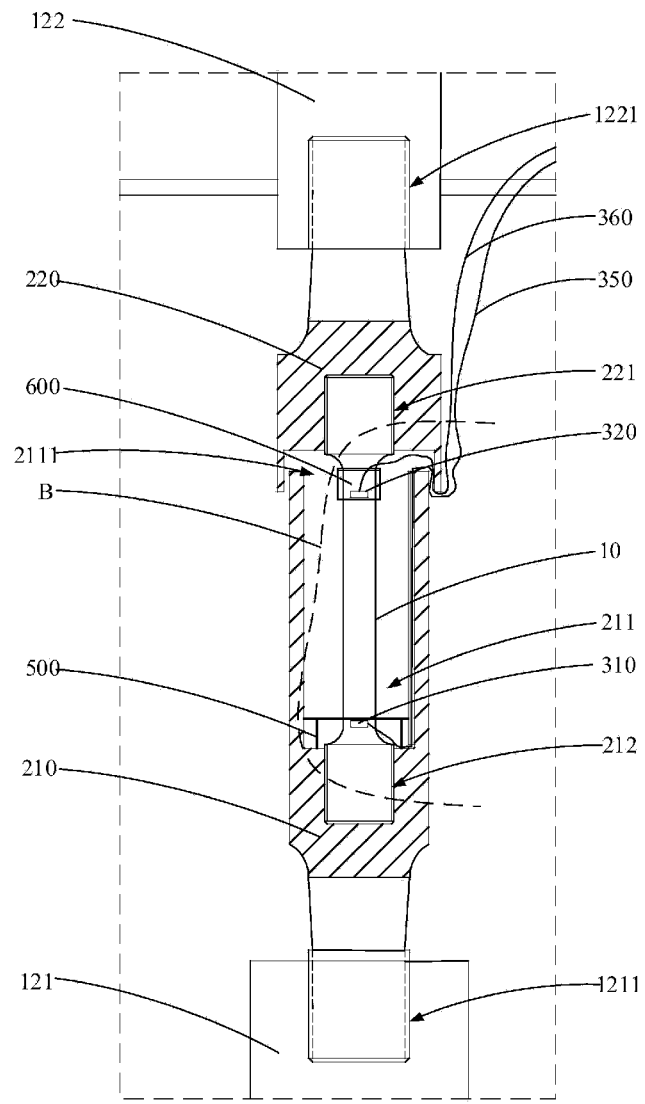
FIG. 2 is a partially-enlarged schematic structural diagram of portion A shown in FIG. 1.
Figure 3:
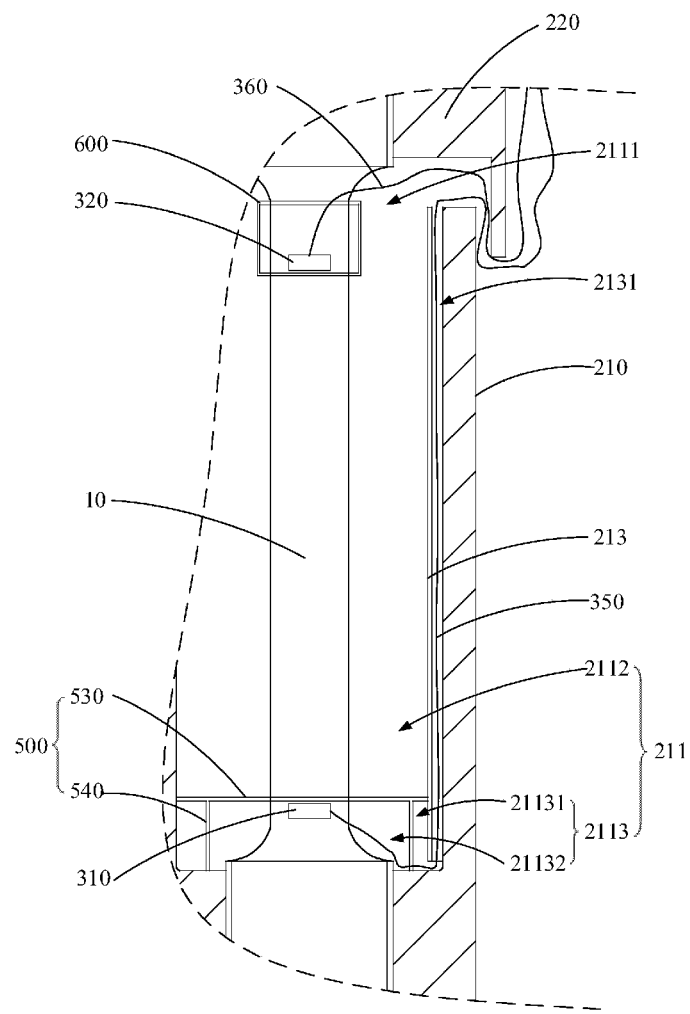
FIG. 3 is a partially-enlarged schematic structural diagram of a section of a figure shown in FIG. 2 along line B.

As shown in FIGS. 2 and 3, the first clamp 210 is provided with an accommodation cavity 211 for accommodating a corrosive substance, and the accommodation cavity 211 is provided with an opening 2111 that is provided on the first clamp 210 and close to one end of the second clamp 220. In other words, one end of the first clamp 210 close to the second clamp 220 passes through the accommodation cavity 211, and the first clamp 210 may place the test specimen 10 in the accommodation cavity 211 when fixing the test specimen 10.

The above corrosive substance may be molten metal, for example, a molten aluminum-silicon alloy. Certainly, a corresponding corrosive substance may be replaced according to specific use environments of the test specimen 10. The first clamp 210 is made of a high temperature resistant material, the corrosive substance is used for being placed into the accommodation cavity 211 through the opening 2111 of the accommodation cavity 211 of the first clamp 210, one end of the test specimen 10 may extend into the accommodation cavity 211 through the opening of the accommodation cavity 211 and be fixed by the first clamp 210, and the other end of the test specimen 10 may be fixed by the second clamp 220. In this way, the test specimen 10 is fixed by the first clamp 210 and the second clamp 220, and the corrosive substance is placed in the accommodation cavity 211, that is, the test specimen may be placed in a corrosive environment, so as to be convenient to test.

As shown in FIGS. 1 and 2, the strain measurement mechanism includes a first acoustic emission sensor 310, a second acoustic emission sensor 320 and an acoustic emitter 340, the first acoustic emission sensor 310 and the second acoustic emission sensor 320 are both in communication connection with the acoustic emitter 340, and the first acoustic emission sensor 310 and the second acoustic emission sensor 320 are arranged on the test specimen 10 at an interval in a tensile direction of the test specimen 10.

As shown in FIG. 2, specifically, the test specimen 10 has a gauge length section, a length direction of the gauge length section is the tensile direction of the test specimen 10, the first acoustic emission sensor 310 is arranged at one end of the gauge length section, and the second acoustic emission sensor 320 is arranged at the other end of the gauge length section. The first acoustic emission sensor 310 and the second acoustic emission sensor 320 may collect stress waves emitted by the test specimen 10, and the stress waves are recorded and analyzed by the acoustic emitter 340. The acoustic emitter 340 is a multi-channel acoustic emitter.

Optionally, the first acoustic emission sensor 310 and the second acoustic emission sensor 320 may be fixed on a surface of the test specimen 10 through adhesion or magnetic attraction.

As shown in FIG. 1, further, the strain measurement mechanism further includes a signal amplifier 330, and the signal amplifier 330 is connected between the first acoustic emission sensor 310 and the acoustic emitter 340, and between the second acoustic emission sensor 320 and the acoustic emitter 340. The signal amplifier 330 is used for amplifying sounds collected by the first acoustic emission sensor 310 and the second acoustic emission sensor 320 such that the sounds may be recorded and analyzed by the acoustic emitter 340.

The protective assembly is used for being connected to the test specimen 10, and may isolate the first acoustic emission sensor 310 and the second acoustic emission sensor 320 from the corrosive substance when the test specimen 10 is placed in the accommodation cavity 211.

As shown in FIGS. 1-3, when the above device for testing corrosion fatigue resistance on the basis of acoustic emission is used, two ends of the test specimen 10 are fixed by the first clamp 210 and the second clamp 220 respectively, and the test specimen is placed in the accommodation cavity 211 and surrounded by the corrosive substance such that the test specimen 10 may be placed in a corrosive environment. Moreover, in a process that the test specimen 10 is placed in the corrosive environment, the protective assembly may isolate the first acoustic emission sensor 310 and the second acoustic emission sensor 320 from the corrosive substance, so as to prevent the first acoustic emission sensor 310 and the second acoustic emission sensor 320 from being corroded. The driving source 130 is used for driving the first tensile member 121 and the second tensile member 122 to more away from each other, such that the test specimen 10 is stretched with a load borne. The first acoustic emission sensor 310 and the second acoustic emission sensor 320 may start to collect stress waves at an initial stage of stretching the test specimen 10, and the acoustic emitter 340 may record data such as amplitudes, ringing counts, duration, rise time and/or relative energy of the wave forms, such that deformation of the test specimen 10, crack initiation positions and crack propagation speeds are analyzed and/or residual fatigue life is computed according to the above data, and accuracy is high.

Time when the first acoustic emission sensor 310 and the second acoustic emission sensor 320 receive the stress waves is obtained to measure a length change of a gauge length section of the test specimen 10, so as to determine deformation of the test specimen 10. A method for measuring a length change of a gauge length section is as follows: according to the stress wave theory, it can be seen that a stress wave propagation speed of a certain material is only related to an elastic modulus E and density ρ of the material, that is, the stress wave propagation speed V is a unique property of the material. A length $L_0$ (which may be measured in advance by a measuring ruler) of the gauge length section of the test specimen 10 is known, when a load is initially applied to the test specimen 10, the first acoustic emission sensor 310 collects initial stress waves, and the acoustic emitter 340 records characteristics of the initial stress waves and time $t_1$ when the initial stress waves are collected. By comparing characteristic information of the stress waves, time $t_2$ when the second acoustic emission sensor 320 collects initial stress waves may be determined. By comparing $|V \times t_2 - V \times t_1|$ and $L_0$, whether an acoustic emission source is located between the first acoustic emission sensor 310 and the second acoustic emission sensor 320 or two sides thereof may be determined. If $|V \times t_2 - V \times t_1| > L_0$, it is determined that the acoustic emission source is located on two sides of the first acoustic emission sensor 310 and the second acoustic emission sensor 320, and in this case, a length of the gauge length section of the test specimen 10 is $L_1 = |V \times t_2 - V \times t_1|$. If $|V \times t_2 - V \times t_1| < L_0$, it is determined that the acoustic emission source is located between the first acoustic emission sensor 310 and the second acoustic emission sensor 320, and in this case, a length of the gauge length section of the test specimen 10 is $L_1 = |V \times t_2 - V \times t_1|$.

Figure 6:
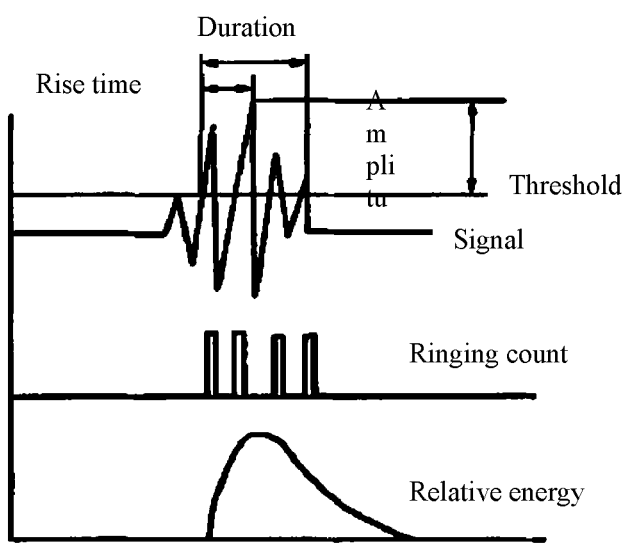
FIG. 6 is a test diagram obtained by carrying out a test by means of a device for testing corrosion fatigue resistance on the basis of acoustic emission according to an embodiment of the present disclosure.

As shown in FIG. 6, an amplitude and an impact rate of a waveform of a stress wave are highly sensitive to early crack initiation, and moreover, the amplitude and the impact rate are extremely active during early fatigue crack initiation and gradually increase with an increase in fatigue crack initiation density. Therefore, when the amplitude and the impact rate of a burst signal are higher than specified amplitudes, it is determined that there is crack initiation. A position of a crack is determined by computing time $t_3$ and $t_4$ when a high-amplitude signal reaches the first acoustic emission sensor 310 and the second acoustic emission sensor 320, such that the crack is away from the first acoustic emission sensor 310 by a distance of $V \times t_3$.

In the test, any signal that the first acoustic emission sensor or the second acoustic emission sensor obtains data of a given amplitude is called an impact, which is mainly used for activity evaluation of the signal and reflects the total amount and frequency of acoustic emission activity.

The acoustic emission sensor outputs a ringing pulse when oscillating every time, and change situations thereof with the number of load cycles reflects main characteristics of a fatigue crack signal, such that the ringing counts of the acoustic emission signal may be used to predict a crack propagation speed. Equation (1) shows a correlation between a ringing count and a fatigue crack propagation speed.

$$\frac{d\eta}{dn} = C\left(\frac{1}{B}\frac{d\eta}{dn}\right)^{\frac{m}{p}} \quad (1)$$

where, η is a ringing count, n is the number of fatigue cycles, C is a structure coefficient of a test specimen, which is measured through tests, B is a correction factor of a stress intensity factor, m and P are material constants of the test specimen, and generally, in the case of most metal materials commonly used in engineering, m/p=2-4.

Under the action of a cyclic stress, plastic deformation and crack propagation generated in the material of the test specimen 10 at a stress peak will generate acoustic emission signals having high amplitudes, while when a stress level is reduced, there will be shear deformation at a crack tip, and the crack will be closed at the same time. In this case, fretting friction will occur on a fracture surface, and acoustic emission signals having low amplitudes will be generated. Therefore, the fatigue life of the material may be predicted according to formula (2) by obtaining a corresponding value from a relation between an energy rate and a crack in acoustic emission parameters.

$$\Delta N_j = \int_{a_j}^{a_{j+1}} \frac{(1-R)(K_c - K_{maxj})}{C_2(\Delta R_j)^{m_2}} da \quad (2)$$

$$a_{j+1} = \gamma a_j, \gamma \approx 1.1$$

$$N = \sum_{j=1}^{f} \Delta N_j$$

where $a_{j+1}$ is an upper limit value of a crack length, $a_j$ is a lower limit value of a crack length, R is a stress ratio, $K_c$ is fracture toughness of a test specimen, $K_{maxj}$ is maximum stress intensity of the test specimen, $C_2$ is a structural constant, which may be measured from the test specimen, $\Delta K_j$ is a stress intensity range of the test specimen, $m_2$ is a material constant, and generally, in the case of most metal materials commonly used in engineering, $m_2$=2-4, N is the number of cycles, f is a final crack length, and $\Delta N_j$ is a change in crack lengths between two cycles.

As shown in FIG. 1, further, the device for testing corrosion fatigue resistance on the basis of acoustic emission further includes a heater 400, the heater 400 is provided with a heating chamber 410, and the clamping mechanism 200 is located in the heating chamber 410. In this way, after the clamping mechanism 200 clamps the test specimen 10, the heater 400 may heat the corrosive substance and the test specimen 10 at the same time. In this way, the above device for testing corrosion fatigue resistance on the basis of acoustic emission may overcome the defect of incompleteness of a research on a single factor of high-temperature liquid metal corrosion or high-temperature fatigue of a material. By placing an aluminum-silicon alloy in the accommodation cavity 211 of the first clamp 210 to be in full contact with the test specimen 10, a corrosive environment of the test specimen 10 in the case of high-temperature molten metal may be simulated and used for researching an influence of a synergistic effect of high-temperature fatigue and high-temperature molten metal corrosion on material performance, and for researching an influence of molten metal corrosion on fatigue performance and an influence of fatigue behavior on high-temperature molten metal corrosion. Therefore, an evolution law of high-temperature mechanical and chemical performance of the material in a service stage may be accurately simulated and revealed, which has important theoretical significance and engineering application value for long-term safe and reliable operation of apparatuses such as heat exchange tubes for concentrating solar thermal power.

Specifically, the heater 400 is further provided with a first avoidance hole in communication with the heating chamber 410 and a second avoidance hole in communication with the heating chamber 410, the heater 400 sleeves the clamping mechanism 200, and the clamping mechanism 200 is located in the heating chamber 410. The first avoidance hole is used for the first tensile member 121 to pass through such that the heater 400 may avoid the first tensile member 121, and the second avoidance hole is used for the second tensile member 122 to pass through such that the heater 400 may avoid the second tensile member 122.

More specifically, the heater 400 includes a pair of half furnace bodies hinged to each other and capable of being opened and closed in a horizontal direction, the first avoidance hole is provided at a bottom of the heater 400, the second avoidance hole is provided at a top of the heater 400, the heater 400 may sleeve the clamping mechanism 200, the first tensile member 121 passes through the first avoidance hole, and the second tensile member 122 passes through the second avoidance hole.

Optionally, the heater 400 is a temperature control heating furnace, and a tester may accurately adjust a temperature of the heater 400 to set a test temperature.

Further, the heater 400 is further provided with heat insulation cotton for reducing heat loss.

In an embodiment, the main machine 100 further includes a temperature sensor 150, the temperature sensor 150 is arranged on the heater 400 to measure a temperature of the heating chamber 410 such that a tester may control a heating temperature of the heater 400.

As shown in FIG. 2, in an embodiment, one end of the first tensile member 121 close to the second tensile member 122 is provided with a first assembly hole 1211, and one end of the first clamp 210 away from the second clamp 220 passes through the first assembly hole 1211. The first clamp 210 passes through the first assembly hole 1211 to be fixed to the first tensile member 121.

Specifically, the first tensile member 121 is a lower pull rod, the second tensile member 122 is an upper pull rod, a top end of the first tensile member 121 is provided with the first assembly hole 1211, and a bottom of the first clamp 210 passes through the first assembly hole 1211 to be fixedly connected to the first tensile member 121.

More specifically, the first assembly hole 1211 is a threaded hole with an internal thread, the bottom of the first clamp 210 is provided with an external thread matching the internal thread of the first assembly hole 1211, the bottom of the first clamp 210 passes through the first assembly hole 1211, and the first clamp 210 is in threaded connection to the first tensile member 121.

Further, one end of the second tensile member 122 close to the first tensile member 121 is provided with a second assembly hole 1221, and one end of the second clamp 220 away from the first clamp 210 passes through the second assembly hole 1221. The second clamp 220 passes through the second assembly hole 1221 to be fixed to the second tensile member 122.

Specifically, a bottom end of the second tensile member 122 is provided with the second assembly hole 1221, and a top of the second clamp 220 passes through the second assembly hole 1221 to be fixedly connected to the second tensile member 122.

More specifically, the second assembly hole 1221 is a threaded hole with an internal thread, the top of the second clamp 220 is provided with an external thread matching the internal thread of the second assembly hole 1221, the top of the second clamp 220 passes through the second assembly hole 1221, and the second clamp 220 is in threaded connection to the second tensile member 122.

As shown in FIG. 2, further, the accommodation cavity 211 is provided with a bottom wall that is arranged opposite the opening 2111 of the accommodation cavity 211, the bottom wall is provided with a first mounting hole 212, and the first mounting hole 212 is used for the test specimen 10 to pass through. In this way, the test specimen 10 may extend into the accommodation cavity 211 through the opening 2111 of the accommodation cavity 211 and passes through the first mounting hole 212, so as to fix the test specimen 10 to the first clamp 210.

Specifically, an upper end face of the first clamp 210 passes through the accommodation cavity 211 of the first clamp 210, the opening 2111 of the accommodation cavity 211 is formed on the upper end face of the first clamp 210, the first mounting hole 212 is provided on the bottom wall of the accommodation cavity 211, the first mounting hole 212 is a threaded hole with an internal thread, the bottom of the test specimen 10 is provided with an external thread matching the internal thread of the first mounting hole 212, the bottom of the test specimen 10 may pass through the first mounting hole 212, and the test specimen 10 may be in threaded connection to the first clamp 210.

The first clamp 210 is further provided with a first transition section located between the external thread and the threaded hole of the first clamp 210, and a diameter of the first transition section is greater than a diameter of a portion of the test specimen 10 passing through the first mounting hole 212, such that it is ensured that a stress borne by the first transition section is less than a stress borne by the test specimen 10 during a test.

Further, one end of the second clamp 220 close to the first clamp 210 is provided with a second mounting hole 221 for the test specimen 10 to pass through such that the test specimen 10 may pass through the second mounting hole 221, so as to fix the test specimen 10 to the second clamp 220.

Specifically, the second mounting hole 221 is provided on a lower end face of the second clamp 220, the second mounting hole 221 is a threaded hole with an internal thread, the top of the test specimen 10 is provided with an external thread matching the internal thread of the second mounting hole 221, the top of the test specimen 10 may pass through the second mounting hole 221, and the test specimen 10 is in threaded connection to the second clamp 220.

The second clamp 220 is further provided with a second transition section located between the external thread and the threaded hole of the second clamp 220, and a diameter of the second transition section is greater than a diameter of a portion of the test specimen 10 passing through the second mounting hole 221, such that it is ensured that a stress borne by the second transition section is less than a stress borne by the test specimen 10 during a test.

As shown in FIG. 2, in an embodiment, the protective assembly includes a first protector 500, and the first protector 500 is used for sleeving the test specimen 10 to seal the first acoustic emission sensor 310, so as to isolate the first acoustic emission sensor 310 from the corrosive substance when the test specimen 10 is placed in the accommodation cavity 211. In this way, the situation that the first acoustic emission sensor 310 is corroded by the corrosive substance during a test, so as cause damage to the first acoustic emission sensor 310 or inaccurate measurement results may be avoided.

The first protector 500 is made of a high temperature resistant material.

As shown in FIG. 3, specifically, the first protector 500 is connected to the wall of the accommodation cavity 211 in a sealed manner when the test specimen 10 is placed in the accommodation cavity 211, so as to divide the accommodation cavity 211 into a corrosive cavity 2112 and a protective cavity 2113, the corrosive cavity 2112 is used for carrying a corrosive substance, and the first acoustic emission sensor 310 is located in the protective cavity 2113. After the first protector 500 sleeves the test specimen 10, the first protector 500 abuts against the wall of the accommodation cavity 211, such that a sealing structure is formed between the first protector 500 and the accommodation cavity 211, and the first protector 500 may further divide the accommodation cavity 211 into a corrosive cavity 2112 and a protective cavity 2113. The corrosive substance is used for being placed in the corrosive cavity, such that the first acoustic emission sensor 310 placed in the protective cavity 2113 may be prevented from being corroded by the corrosive substance.

Further, a protective portion 213 is formed on the wall of the accommodation cavity 211, the protective portion 213 is provided with a signal wire channel 2131, one end of the signal wire channel 2131 extends towards the opening 2111 of the accommodation cavity 211 to form a wire inlet, the other end of the signal wire channel 2131 extends towards the bottom of the accommodation cavity 211 to form a wire outlet, and the first protector 500 abuts against an exterior of the protective portion 213, such that the wire outlet of the signal wire channel 2131 is in communication with the protective cavity 2113, and the wire outlet of the signal wire channel 2131 is isolated from the corrosive cavity 2112.

The protective portion 213 is made of a high temperature resistant material.

As shown in FIGS. 1 and 3, the strain measurement mechanism further includes a first signal wire 350, one end of the first signal wire 350 passes through the signal wire channel 2131 to be in communication connection with the first acoustic emission sensor 310, and the other end thereof is in communication connection with the acoustic emitter 340.

During a test of the test specimen 10, the first acoustic emission sensor 310 is located at a bottom end of the gauge length section of the test specimen 10. In other words, after the test specimen 10 extends into the accommodation cavity 211, the first acoustic emission sensor 310 is located at the bottom of the accommodation cavity 211. The first signal wire 350 is used for connecting the first acoustic emission sensor 310 to the acoustic emitter 340, such that the first acoustic emission sensor 310 and the acoustic emitter 340 are in communication with each other. Specifically, in this embodiment, one end of the first signal wire 350 is connected to the first acoustic emission sensor 310, and the other end thereof is connected to the signal amplifier 330. By enabling the first signal wire 350 to pass through the signal wire channel 2131 and the protective cavity 2113 of the protective portion 213, the protective portion 213 and the first protector 500 may protect the first signal wire 350, so as to prevent the first signal wire 350 from being corroded by the corrosive substance.

Figure 4:
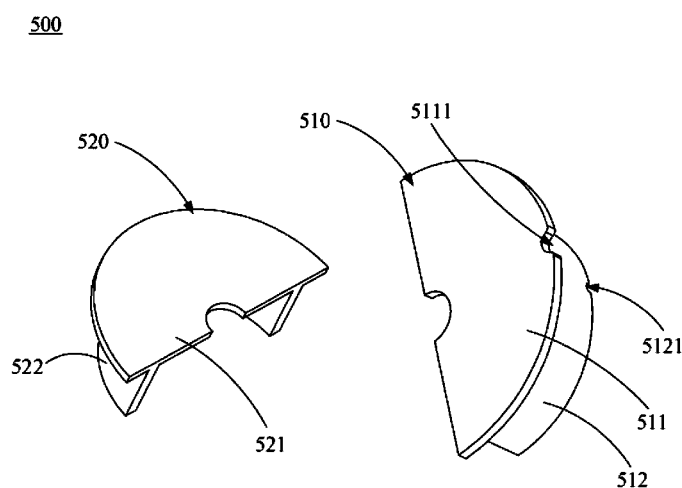
FIG. 4 is an enlarged schematic structural diagram of a first protector according to an embodiment of the present disclosure.

As shown in FIGS. 3 and 4, more specifically, the first protector 500 includes a top cover 530 and a side cover 540 connected to the top cover 530, the top cover 530 is provided with a third avoidance hole for the test specimen 10 to pass through, the top cover 530 is connected to the side wall of the accommodation cavity 211 in a sealed manner, so as to divide the accommodation cavity 211 into a corrosive cavity 2112 and a protective cavity 2113, the side cover 540 is connected to the bottom wall of the accommodation cavity 211 in a sealed manner, so as to divide the protective cavity 2113 into a first cavity 21131 and a second cavity 21132, the side cover 540 is further provided with a wire port 5121 for being in communication with the first cavity 21131 and the second cavity 21132, the first acoustic emission sensor 310 is located in the second cavity 21132, and the first signal wire 350 passes through the wire outlet of the protective portion 213 to enter the first cavity 21131, and then enters the second cavity 21132 through the wire inlet 5121 to be connected to the first acoustic emission sensor 310.

In an embodiment, the first protector 500 includes a first seal cover 510 and a second seal cover 520 detachably connected to the first seal cover 510, the first seal cover 510 includes a first semi-circular top cover 511 and a first semi-ring side cover 512 connected to the first semi-circular top cover 511, the second seal cover 520 includes a second semi-circular top cover 521 and a second semi-ring side cover 522 connected to the second semi-circular top cover 521, the first semi-circular top cover 511 matches the second semi-circular top cover 521 to form the above top cover 530, and the first semi-ring side cover 512 matches the second semi-ring side cover 522 to form the above side cover 540.

Optionally, the first semi-circular top cover 511 and the second semi-circular top cover 521 may be connected to each other through splicing, snap-fit connection or bolt connection, such that the first seal cover 510 may be detachably connected to the second seal cover 520, and the first protector 500 may conveniently sleeve the test specimen 10.

As shown in FIGS. 3 and 4, further, the first semi-circular top cover 511 is provided with an avoidance recess 5111 for avoiding the protective portion 213. Specifically, the protective portion 213 is a strip-shaped protrusion formed on a side wall of the accommodation cavity 211, the protective portion 213 is of a hollow structure having a signal wire channel 2131, the first semi-circular top cover 511 abuts against an outer side of the protective portion 213, and the avoidance recess 5111 avoids the protective portion 213.

Furthermore, the wire port 5121 for the first signal wire 350 to pass through is formed on the first semi-ring side cover 512.

As shown in FIG. 3, in an embodiment, the protective assembly further includes a second protector 600, the second protector 600 is used for sleeving the test specimen 10 to seal the second acoustic emission sensor 320, so as to isolate the second acoustic emission sensor 320 from the corrosive substance when the test specimen 10 is placed in the accommodation cavity 211. In this way, damage to the second acoustic emission sensor 320 or inaccurate measurement results caused when the second acoustic emission sensor 320 is corroded by the corrosive substance during a test may be avoided.

The second protector 600 is made of a high temperature resistant material.

Figure 5:
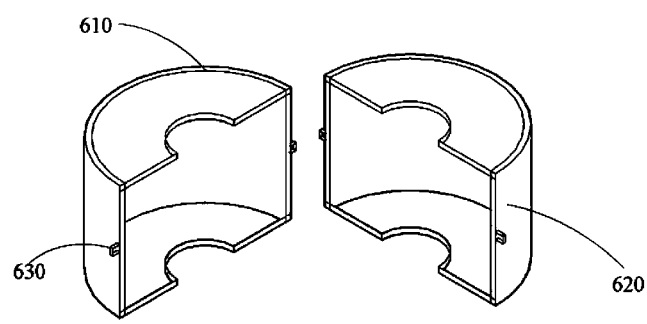
FIG. 5 is an enlarged schematic structural diagram of a second protector according to an embodiment of the present disclosure.

As shown in FIGS. 3 and 5, specifically, the second protector 600 is of a hollow structure, upper and lower sides of the second protector 600 are provided with a fourth avoidance hole and a fifth avoidance hole respectively, the fourth avoidance hole and the fifth avoidance hole both are used for the test specimen 10 to pass through, and the second acoustic emission sensor 320 is arranged in the second protector 600.

More specifically, the second protector 600 includes a first semi-cylinder protective cover 610 and a second semi-cylinder protective cover 620 detachably connected to the first semi-cylinder protective cover 610, the first semi-cylindrical protective cover 610 and the second semi-cylindrical protective cover 620 are provided with turnbuckles 630 respectively, and the first semi-cylinder protective cover 610 and the second semi-cylinder protective cover 620 are fixed with screws to be protected against separation.

As shown in FIGS. 1 and 3, further, the strain measurement mechanism further includes a second signal wire 360, one end of the second signal wire 360 passes through the fourth avoidance hole of the second protector 600 to be in communication connection with the second acoustic emission sensor 320, and the other end thereof is in communication connection with the acoustic emitter 340, such that the second acoustic emission sensor 320 is in communication with the acoustic emitter 340.

Specifically, in this embodiment, one end of the second signal wire 360 passes through the fourth avoidance hole of the second protector 600 to be connected to the second acoustic emission sensor 320, and the other end thereof is connected to the signal amplifier 330.

As shown in FIGS. 1-3, a method for carrying out a corrosion fatigue test by means of the above device for testing corrosion fatigue resistance on the basis of acoustic emission includes steps as follows:

step 1: fix a first acoustic emission sensor 310 and a second acoustic emission sensor 320 on two ends of a gauge length section of a test specimen 10 respectively;

step 2: enable any end of the test specimen 10 to fixedly pass through a first mounting hole 212 (the acoustic emission sensor close to the first clamp is a first acoustic emission sensor) of a first clamp 210, place the first protector 500 at a bottom of the accommodation cavity 211 of the first clamp 210, such that the first protector 500 seals the first acoustic emission sensor 310, add a corrosive substance into the accommodation cavity 211, and enable the other end of the test specimen 10 to fixedly pass through a second mounting hole 221 of a second clamp 220;

step 3: enable one end of the first clamp 210 to fixedly pass through a first assembly hole 1211 of a first tensile member 121, enable one end of the second clamp 220 to fixedly pass through a second assembly hole 1221 of a second tensile member 122, pre-stretch the first tensile member 121 by a driving source 130, and collect and screen stress waves; and step 4: start the driving source 130 and a heater 400, set a temperature required by a test and a force value required to be loaded, and carry out a fatigue test.

The above device for testing corrosion fatigue resistance on the basis of acoustic emission and method for a corrosion fatigue test may overcome the defect of incompleteness of a research on a single factor of high-temperature liquid metal corrosion or high-temperature fatigue of a material. By placing an aluminum-silicon alloy in the accommodation cavity 211 of the first clamp 210 to be in full contact with the test specimen 10, a corrosive environment of the test specimen 10 in the case of high-temperature molten metal may be simulated and used for researching an influence of a synergistic effect of high-temperature fatigue and high-temperature molten metal corrosion on material performance, and for researching an influence of molten metal corrosion on fatigue performance and an influence of fatigue behavior on high-temperature molten metal corrosion. Therefore, an evolution law of high-temperature mechanical and chemical performance of the material in a service stage may be accurately simulated and revealed, which has important theoretical significance and engineering application value for long-term safe and reliable operation of apparatuses such as heat exchange tubes for concentrating solar thermal power.

In the illustration of the description, illustration with reference to terms "an embodiment", "some embodiments", "illustrative embodiments", "examples", "particular examples", or "some examples", etc. means that specific features, structures, materials or characteristic described in combination with this embodiment or example are contained in at least one embodiment or example of the present disclosure. In the description, schematic expressions of the above terms do not necessarily refer to the same embodiment or example. Moreover, the specific features, structures, materials or characteristics described can be combined in a suitable manner in any one or more embodiments or examples.

Although embodiments of the present disclosure have been illustrated and described, those of ordinary skill in the art can understand that various changes, modifications, replacements and variations can be made to these embodiments without departing from the principle and purpose of the present disclosure, and the scope of the present disclosure is limited by the claims and equivalents thereof.

The invention claimed is:

1. A device for testing corrosion fatigue resistance on the basis of acoustic emission, comprising:
    a main machine comprising a supporting frame and a tensile mechanism arranged on the supporting frame;
    a clamping mechanism comprising a first clamp and a second clamp that is arranged opposite the first clamp, wherein the first clamp and the second clamp are both connected to the tensile mechanism, the tensile mechanism is used for driving the first clamp and the second clamp to move close to or away from each other, the first clamp is provided with an accommodation cavity for accommodating a corrosive substance, and the accommodation cavity is provided with an opening that is provided on the first clamp and close to one end of the second clamp, and the first clamp is capable of placing the test specimen in the accommodation cavity when fixing the test specimen;

a strain measurement mechanism comprising a first acoustic emission sensor, a second acoustic emission sensor and an acoustic emitter, wherein the first acoustic emission sensor and the second acoustic emission sensor are both in communication connection with the acoustic emitter, and the first acoustic emission sensor and the second acoustic emission sensor are arranged on the test specimen at an interval in a tensile direction of the test specimen; and a protective assembly for being connected to the test specimen and capable of isolating the first acoustic emission sensor and the second acoustic emission sensor from the corrosive substance when the test specimen is placed in the accommodation cavity;

wherein a protective portion is formed on a wall of the accommodation cavity, the protective portion is provided with a signal wire channel, one end of the signal wire channel extends towards the opening to form a wire inlet, and the other end of the signal wire channel extends towards a bottom of the accommodation cavity to form a wire outlet;

the protective assembly comprises a first protector, the first protector is used for sleeving the test specimen, the first protector abuts against an exterior of the protective portion, the first protector comprises a top cover and a side cover connected to the top cover, the top cover is connected to a side wall of the accommodation cavity in a sealed manner, so as to divide the accommodation cavity into a corrosive cavity and a protective cavity, the side cover is connected to a bottom wall of the accommodation cavity in a sealed manner, so as to divide the protective cavity into a first cavity and a second cavity, the side cover is further provided with a wire port for being in communication with the first cavity and the second cavity, and the first acoustic emission sensor is located in the second cavity; and the strain measurement mechanism further comprises a first signal wire, wherein one end of the first signal wire sequentially passes through the signal wire channel, the wire outlet, the first cavity, the wire port and the second cavity, to be connected to the first acoustic emission sensor, and the other end of the first signal wire is in communication connection with the acoustic emitter.

2. The device for testing corrosion fatigue resistance on the basis of acoustic emission according to claim 1, wherein the tensile mechanism comprises a tensile assembly and a driving source in drive connection to the tensile assembly, the tensile assembly comprises a first tensile member and a second tensile member that is arranged opposite the first tensile member at an interval, the driving source is used for driving the first tensile member and the second tensile member to move close to or away from each other, the first clamp is connected to the first tensile member, and the second clamp is connected to the second tensile member.

3. The device for testing corrosion fatigue resistance on the basis of acoustic emission according to claim 2, wherein one end of the first tensile member close to the second tensile member is provided with a first assembly hole, one end of the first clamp away from the second clamp passes through the first assembly hole, the accommodation cavity is provided with the bottom wall that is arranged opposite the opening, the bottom wall is provided with a first mounting hole, and the first mounting hole is used for the test specimen to pass through; and one end of the second tensile member close to the first tensile member is provided with a second assembly hole, one end of the second clamp away from the first clamp passes through the second assembly hole, and one end of the second clamp close to the first clamp is provided with a second mounting hole for the test specimen to pass through.

4. The device for testing corrosion fatigue resistance on the basis of acoustic emission according to claim 2, wherein the driving source is in drive connection to the first tensile member, so as to drive the first tensile member to move close to or away from the second tensile member; and the device for testing corrosion fatigue resistance on the basis of acoustic emission further comprises a force sensor and a displacement sensor, wherein the force sensor is used for measuring a load borne by the test specimen, and the displacement sensor is used for measuring a displacement change of the first tensile member.

5. The device for testing corrosion fatigue resistance on the basis of acoustic emission according to claim 1, wherein the protective assembly comprises a second protector, and the second protector is used for sleeving the test specimen to seal the second acoustic emission sensor, so as to isolate the second acoustic emission sensor from the corrosive substance when the test specimen is placed in the accommodation cavity.

6. The device for testing corrosion fatigue resistance on the basis of acoustic emission according to claim 1, further comprising a heater, wherein the heater is provided with a heating chamber, and the clamping mechanism is located in the heating chamber.

* * * * *